US006798631B1

(12) United States Patent
Farsetta

(10) Patent No.: US 6,798,631 B1
(45) Date of Patent: Sep. 28, 2004

(54) CONVENIENCE SAFETY TIMER

(76) Inventor: Roberta Maria Farsetta, 133 Old Middletown Rd., Pearl River, NY (US) 10965

( * ) Notice: Subject to any disclaimer, the term of this patent is extended or adjusted under 35 U.S.C. 154(b) by 62 days.

(21) Appl. No.: 10/138,871

(22) Filed: May 3, 2002

(51) Int. Cl.[7] .................................................. H02H 3/00

(52) U.S. Cl. ........................... 361/115; 361/42; 361/44; 361/93.1

(58) Field of Search ............................. 361/115, 42, 44, 361/93.1, 91.1, 100, 58, 94, 118

(56) References Cited

U.S. PATENT DOCUMENTS 5,160,853 A 11/1992 Simon et al.
5,278,771 A * 1/1994 Nyenya ...................... 700/293
5,309,032 A 5/1994 Nilssen
5,715,214 A 2/1998 Svarnias
5,802,171 A 9/1998 Deutsch
6,121,889 A 9/2000 Janda et al.

* cited by examiner

*Primary Examiner*—Stephen W. Jackson

(57) ABSTRACT

An electrical timer having pre-set options, electronically set via e-prom and microprocessor or other solid-state circuitry, for the activation of an electrical receptacle, with ground-fault circuit protection, contained within the timer housing. This timer is novel and differs from others, as it is designed for user-activation and instantaneous energizalion of said receptacle, based upon immediate need and for fixed and pre-set durations, independent of time-of-day, chronological, calendar-based, or other pre-scheduled means, using simplified selections and modalities, and providing ongoing visual status of timer activity. The timer also has a manual reset (off) function. According to a further aspect, switching-times mechanism is co-located within the timer housing, which includes a suitable electrical plug, an electrical receptacle, an electrical switch operable with the timer, and shock protection via ground-fault circuit interruption circuitry.

7 Claims, 6 Drawing Sheets

FIGURE 1 – PERSPECTIVE VIEW
Note: Drawing is Not to Scale
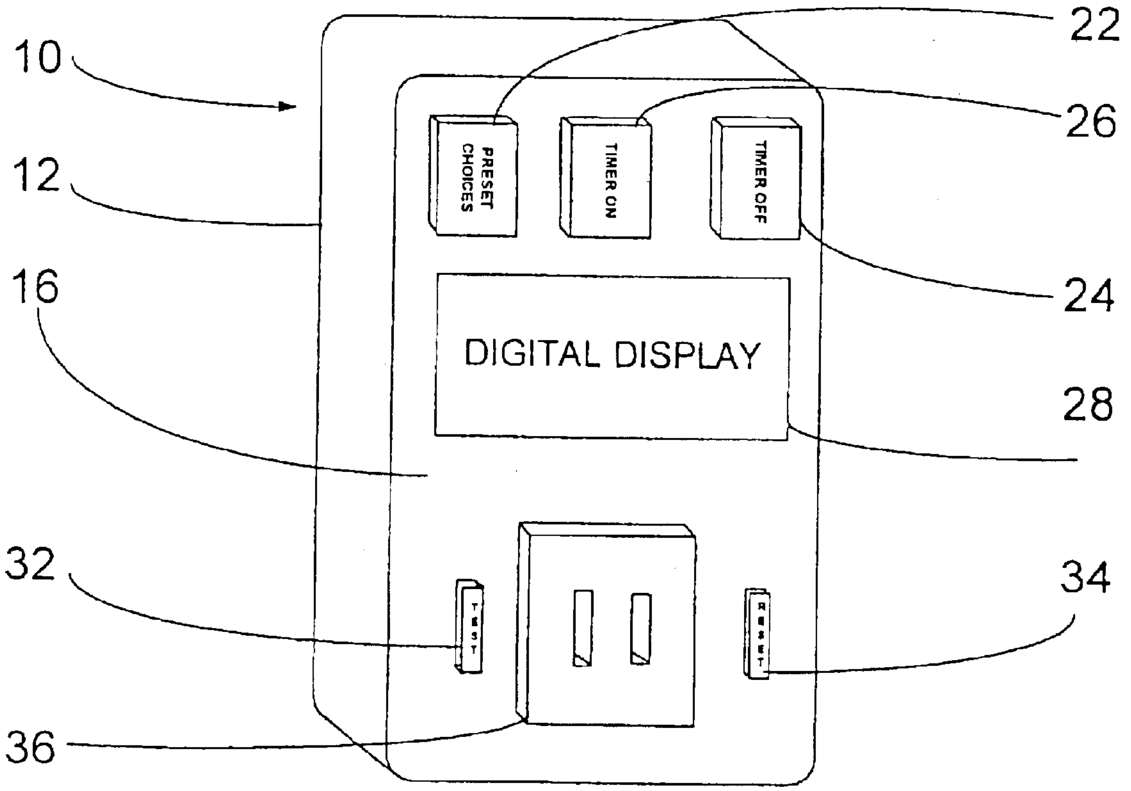

FIGURE 2 – FRONT VIEW
Note: Drawing is Not to Scale
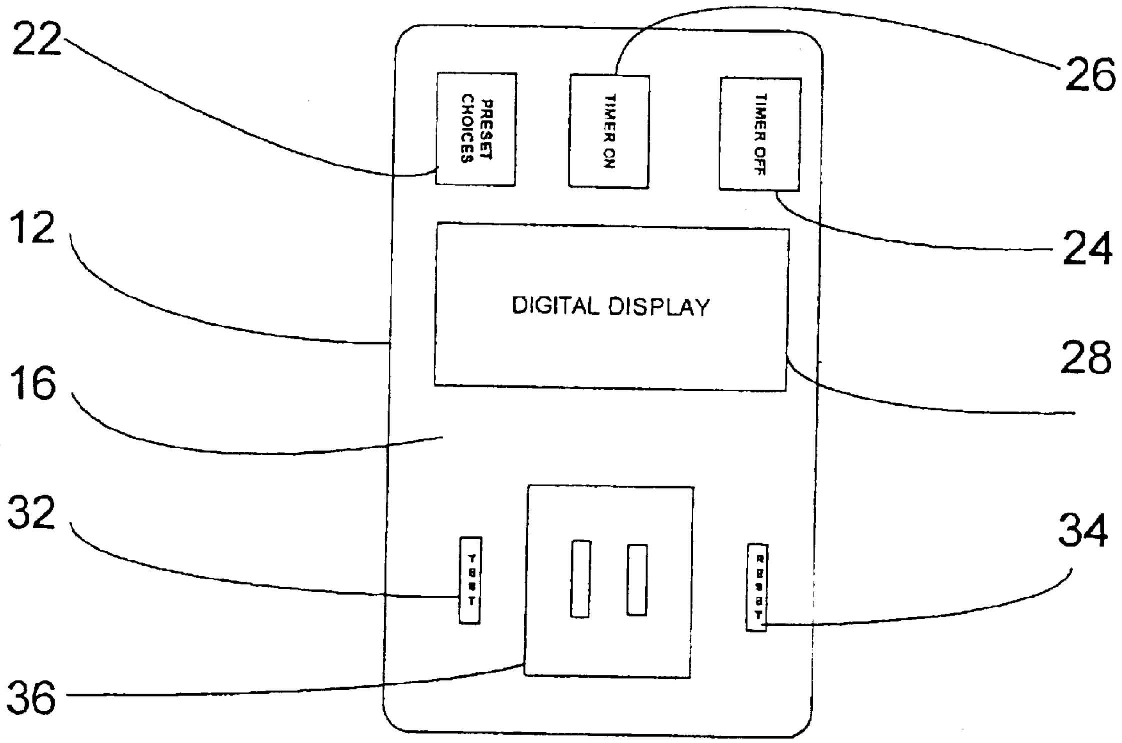

FIGURE 3 – LEFT-SIDE VIEW
Note: Drawing is Not to Scale
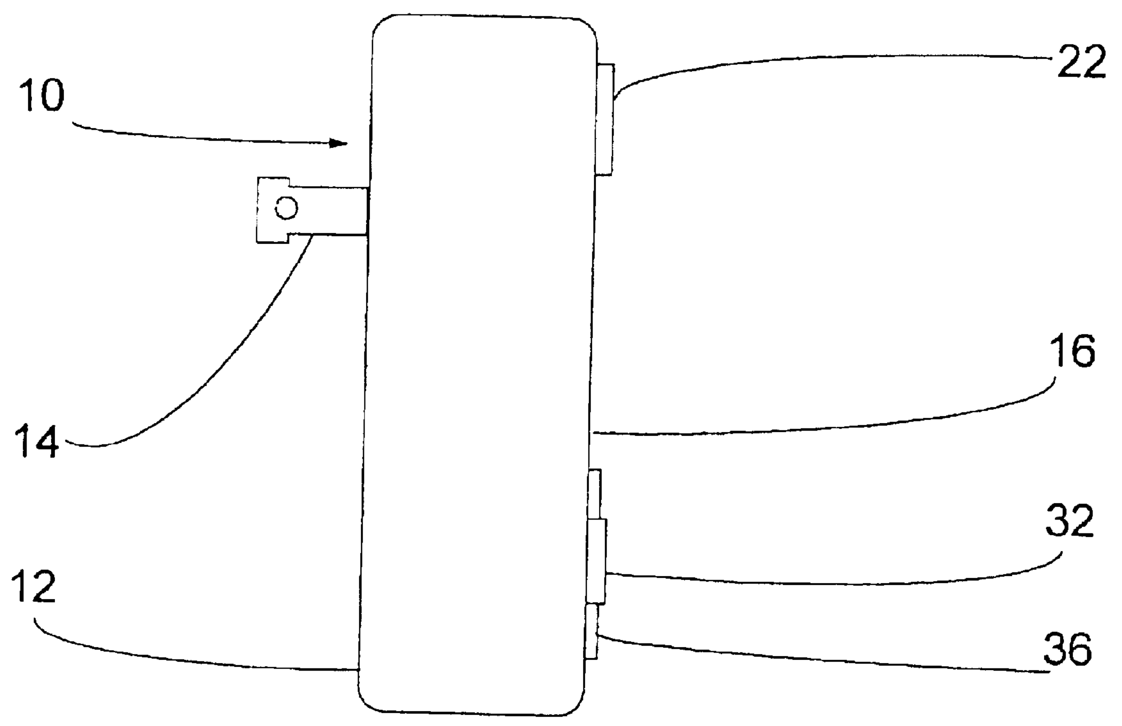

FIGURE 4 – REAR VIEW
Note: Drawing is Not to Scale
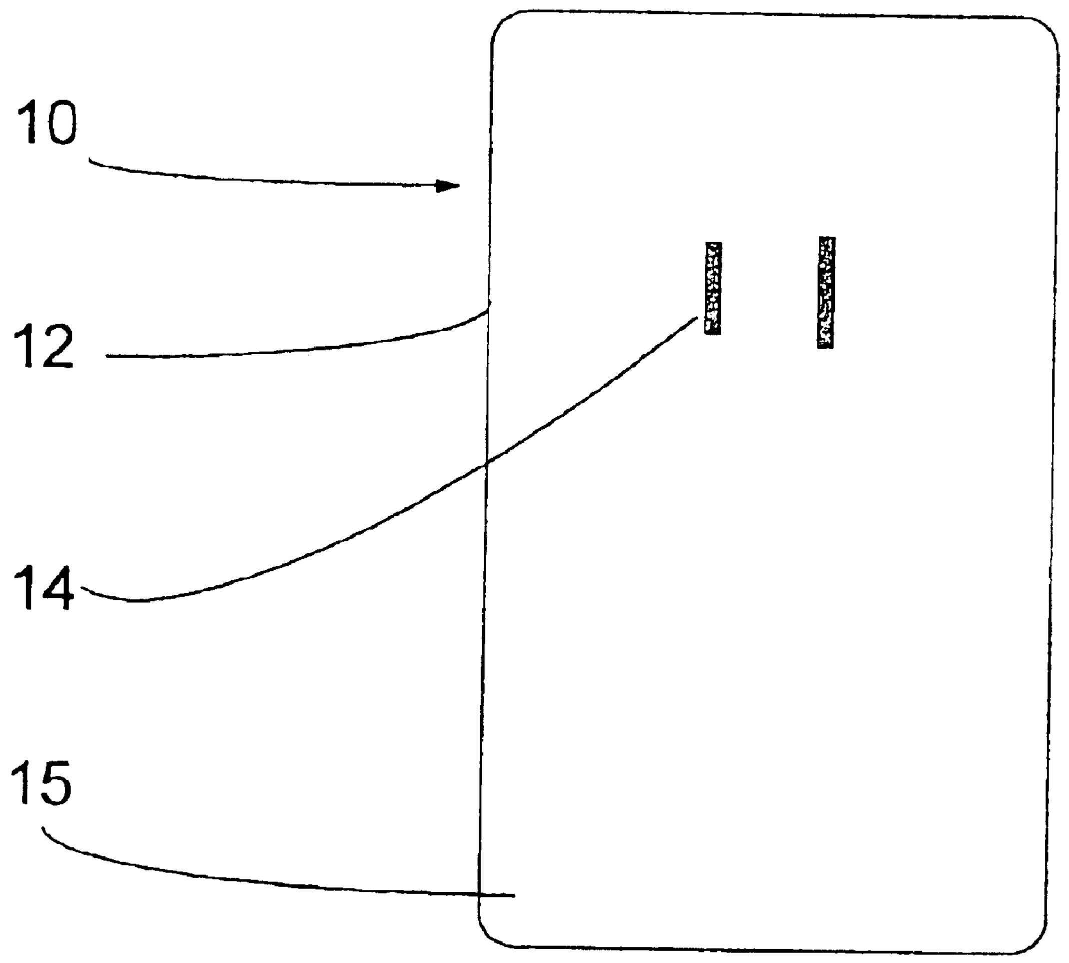

FIGURE 5 – TOP VIEW
Note: Drawing is Not to Scale
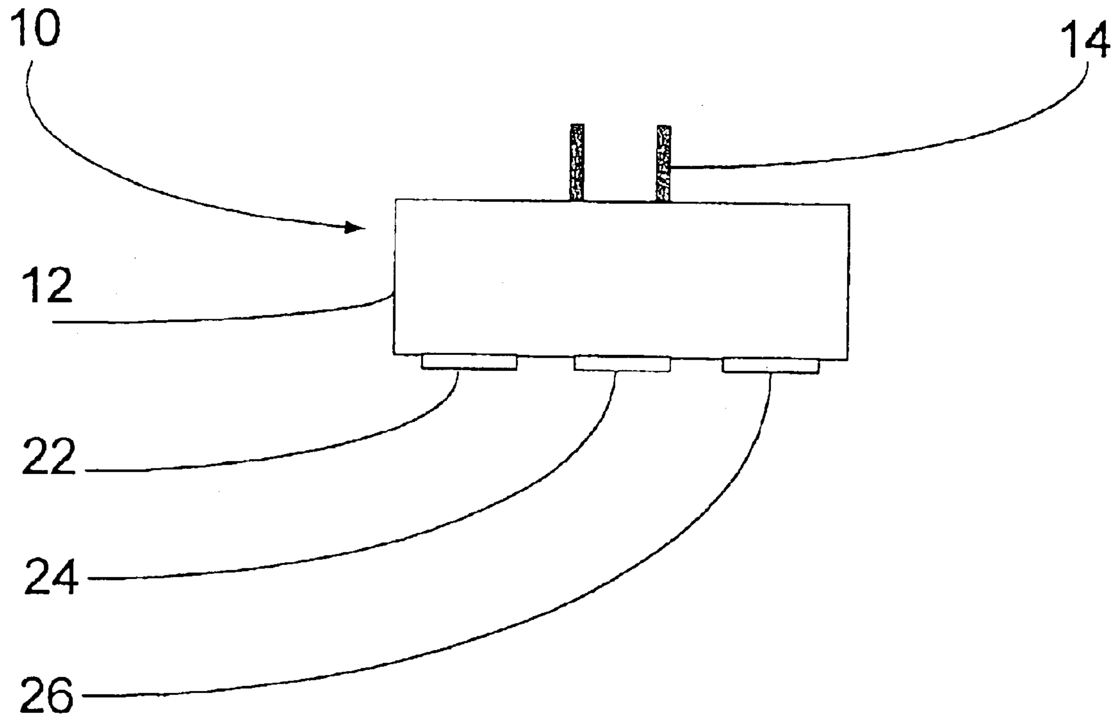

FIGURE 6 – PROCESS FLOW ILLUSTRATION
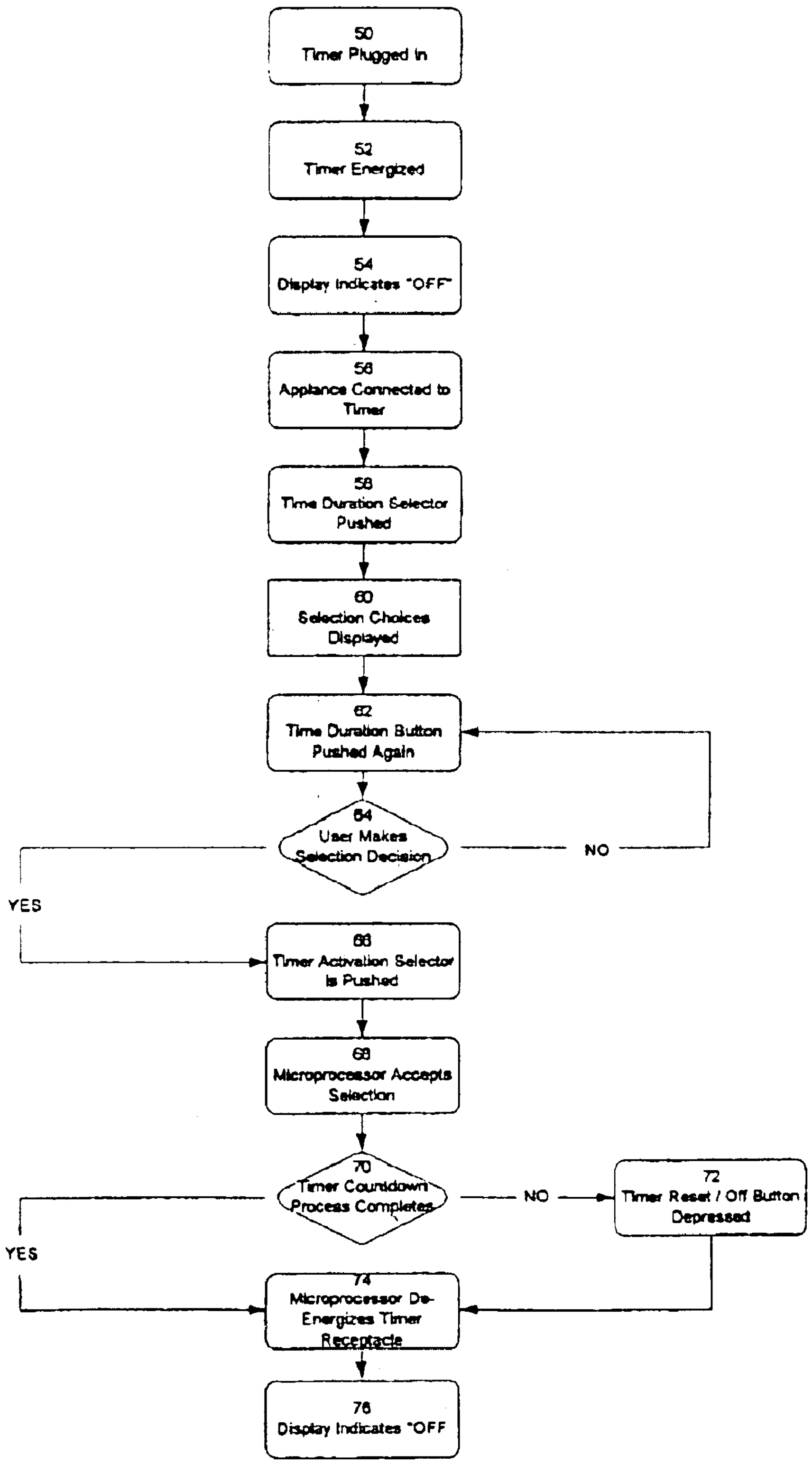

CONVENIENCE SAFETY TIMER

CROSS-REFERENCE TO RELATED APPLICATIONS (Not Applicable)

STATEMENT REGARDING FEDERALLY SPONSORED RESEARCH (Not Applicable)

BACKGROUND OF THE INVENTION

1. Field of the Invention

The present invention relates to electrical timers. Electrical timers are common accessory appliances used in households and businesses. Common types of electrical timers plug into conventional electrical receptacles (line side) and provide a switched electrical receptacle (load side) into which an electrical device, such as a lamp or other appliance, can be plugged. These types of timing mechanisms include an internal switch that is connected in series to the electrical receptacle provided on the timer, thereby providing the basic mechanism by which the attached appliance may be controlled. The user sets the intervals at which the internal switch of the electrical timer operates to turn on and off an electrical supply (operating voltage on the load-side) to the appliance plugged into the timer's electrical receptacle. These timers typically include various interfaces by which a user can set a variety of desired switching times. Some timers require the user to set on and off intervals via push pins (rotary-mechanical timer dials), while others allow timing to be set via microprocessor control. These timers work well, for the functions to which they were intended. Most involve a repeating 24-hour "on/off" cycle of energization and de-energization of the timer's switched receptacle. In fact, some timers at actually require the setting of time-of-day and/or time-and-date before allowing any timed control to operate. Others, via the use of various solid state circuitry, including microprocessors, allow for varied or random intervals of energization/de-energization of the timer's load side. In all instances, time-of-day and day-of-week will typically play crucial roles. These types of timers typically require in-wall permanent installations and do not include electrical receptacles in their design, but rather provide a method of permanent hard-wired control to electrical appliances. timers Most timers which utilize a microprocessor for timing functionality also typically contain an internal battery which is required to allow the user's programming options, including time-and date entries, to survive in the event of a power outage, and allow the unit to continue functioning once power is restored. In all instances, none of these timers afford any shock protection to the user, via or ground-fault protection. Complex options, and the level of required user input and intervention confuse many users. These facts, coupled with the realization that no existing timing device currently provides instantaneous energization of its electrical receptacle for non pre-scheduled and limited durations of time, with ground-fault protection, renders the usability of these existing timing devices impractical for this purpose. It is the object of the present invention to provide a timer, which allows non-scheduled, pre-set, limited-time-duration of energization to an electrical receptacle contained within the timer housing. The present invention provides a novel and user-friendly manner, in which the consumer may control an electrical device which has been connected to the timer via the unit's electrical receptacle, via non-mechanical means, for pre-set and limited periods of time, independent of internal or external power sources to sustain pre-set programming options, and independent of all other factors, while also providing a manual override and shock protection.

2. Description of the Background

Although electrical timers have existed for some time, the purpose, functionality, design, and practicality of using this prior art in the manner intended, envision, and provided-for with this invention, does not exist. For example, conventional timers are typically used to turn electrical appliances on and off at fixed or varying intervals repeatedly on a 24-hour basis. Practical uses for such devices include activating lamps in one's home or office when one is away for an extended period of time, to present the illusion that a dwelling is occupied to an observer. Some timers designed for this purpose have receptacles built in, while some are permanently installed within electrical wall boxes and have hard-wired electrical connections. None are designed for the purpose intended of the present invention; none are singular in nature and designed for with true ease of use and simplified operation; independent of time-of-day, day-of-week, or other inter-dependent timed programming sequences; and none are constructed with shock protection included within their designs.

U.S. Pat. No. 6,121,889 entitled "In-wall electronic timer" discloses a method and apparatus, which permits microprocessor based timing functionality to electrical appliances. The method and apparatus disclosed neither permits simplified programming options via limited and pre-set select ability, or which are not based on time-of-day and day-of-week chronologies, or which require complex user input requirements prior to the timing device being activated or becoming functional. Additionally, the method and apparatus disclosed requires in-wall installation; requires hard-wired and permanent connectivity to the devices it controls; requires an internal battery source, which allows programmed options and time-and-date functionality to continue in the event of a power outage; and offers no ground-fault protection to the user.

U.S. Pat. No. 5,715,214 entitled "Electrical timer with setting window" discloses a method and apparatus which permits somewhat simplified timed programming options within a timer which includes an electrical plug and receptacle. The method and apparatus disclosed does not permit instantaneous presentation or selection modalities allowing non-recurring timed on-off sequences, independent of time-of-day and day-of week. Additionally, the method and apparatus disclosed does not provide ground-fault protection to the user.

U.S. Pat. No. 4,297,546 entitled "Activating means for switch operation in timing apparatus", U.S. Pat. No. 4,558,192 entitled "Multi-range timer switch dial", and U.S. Pat. No. 5,400,302 entitled "Dial-type timer device" all have similar design modalities and limitations to those U.S. Patents listed in the previous paragraphs.

Thus, there is a need for an apparatus and method, which allows a user to select a pre-set and limited time duration, for which a device may be energized via conventional plug, and connected to the timer's receptacle. There is a further need for a method and apparatus which, provides the end-user with the operational means by which selection and timed short-term energization of the timer is activated without the need for complex user input required, prior to the moment of use, without a dependence on time-of-day or day of week or repeating 24-hour intervals, without a dependence for an internal battery source, and which affords shock protection to the user.

SUMMARY OF THE INVENTION

To achieve the foregoing and other objectives and in accordance with the purposes of the present invention, there is provided an electrical timing mechanism, utilizing microprocessor-based technology, to control pre-set scales for setting switching times. Pre-set scales are provided and enabled by way of e-prom or other coded storage device, in combination with the aforementioned microprocessor technology, herein referred to as "microprocessor controlled". Permanent pre-programmed timed durations are stored within the e-prom or hard-coded storage device, thereby eliminating the need for any internal battery or external power source to sustain any pre-programmed timing options. As an example, one embodiment of the present invention may include five (5) timing options pre-programmed within the timer's microprocessor control; 2-minute, 5-minute, 15-minute, 30-minute, and 60-minute timed countdown selections. Microprocessor control, buttons, and switches provide modalities of these, and only these, pre-set choices utilized by the timer and its internal switching mechanism and/or circuits, thusly eliminating any confusion on the user's part as to how to properly time and energize/de-energize the output receptacle. Activation of the timer is simplified via offering only pre-set timer options and touch selection. Visual indicators depict the status of the timing function, via digital display, LCD, LED, or by other electronic means. A reset or manual override function instantly de-energizes the output receptacle. The unit also provides shock protection to the user via ground-fault protection circuitry, and provides a means and methodology of testing and resetting said protection circuitry. In its simplest terms, this convenience timer allows the user to plug an appliance into its receptacle, press a button which represents or offers an instantaneous short-duration energization period, select that particular option, and energize the receptacle for that selected time period, provides timer status and instantaneous de-energization or timer re-set capabilities, and provide ground-fault protection in the process.

BRIEF DESCRIPTION OF THE DRAWINGS

For the present invention to be clearly understood and readily practiced, the present invention will be described in conjunction with the following figures, wherein:

FIG. 1 is a perspective view of a timer according to a first embodiment of the present invention.

FIG. 2 is a front view of the timer shown in FIG. 1.

FIG. 3 provides a left side view of the timer shown in FIG. 1.

FIG. 4 provides a back view of the timer shown in FIG. 1.

FIG. 5 provides a top view of the timer shown in FIG. 1.

DESCRIPTION OF THE PRESENTLY PREFERRED EMBODIMENT

Referring to the FIGS. 1 and 2, a timer 10 is shown. The timer 10 includes a housing 12. On a rear side of the housing 12 (shown in FIG. 4, and further shown in FIGS. 3 and 5), there is a conventional plug 14 for insertion into a conventional electrical receptacle. The conventional plug 14 may be of the 3-prong (grounded) type, or may be of the 2-prong type. In this embodiment, the plug is of the 2-prong type. Located on the front surface 14 of the housing 12 is an outlet receptacle 36. The outlet receptacle 36 is conventionally sized to permit an electrical appliance, such as a lamp, coffee maker, iron, or radio, to to be connected (plugged in).

Referring again to FIGS. 1 and 2, and located on the front surface 16 of the timer housing 12 is a time duration selector 22. In the embodiment shown, the time duration selector 22 is mounted in the housing 12 so as to allow easy access and operation by the consumer. The time duration selector 22 activates pre-programmed and microprocessor controlled timer settings. Repeated depressions of the time duration selector 22 changes the pre-programmed timing options, which are displayed on digital display 28 while the timing selection is being made.

Referring again to FIGS. 1 and 2, and located on the front surface 20 of the timer housing 12 is a timer activation selector 24. In the embodiment shown, the timer activation selector 24 is mounted in the housing 12 so as to allow easy access and operation by the consumer. The timer activation selector 24 activates the pre-programmed timer option chosen by the consumer when using the time duration selector 22, and energizes the timer's outlet receptacle 36.

Referring again to FIGS. 1 and 2, and located on the front surface 20 of the timer housing 12 is a timer reset selector 26. In the embodiment shown, the timer reset selector 26 is mounted in the housing 12 so as to allow easy access and operation by the consumer. The timer reset selector 26 deactivates or resets the pre-programmed timer option chosen by the consumer when using the time duration selector 22, and de-energizes the timer's outlet receptacle 36, after the user has energized receptacle 36 by depressing timer activation selector 24.

Referring again to FIGS. 1 and 2, and located on the front surface 20 is a digital display 28. The purpose of digital display 28 is to provide visual status as to the active timer duration chosen as the result of depressing time duration selector 22, and timer activity status as the result of depressing tinier activation selector 26. The digital display 28 may be a conventional type of display, such as an LED, LCD, active matrix, dual scan, and so on. The digital display 28 is coupled to the microprocessor control internally of the timer housing 12. The digital display 28 provides information to the user to facilitate timed selection choices as pre-set within the microprocessor control, in a manner known in the art. In this embodiment, digital display 28 provides all visual indications of timer status, including time duration and timer on-off status.

Referring again to FIGS. 1 and 2, the microprocessor control (not shown), which is mounted inside the timer housing 12, operates a switch or electronic circuit (not shown), which is also located internally of timer housing 12. The switch or electronic circuitry mentioned in the preceding sentence make and break an electrical connection to receptacle 36, whenever timer activation selector 24 or timer reset selector 26 are depressed, respectively. The combination of selectors 22, 24, and 26, along with digital display 28, comprise the user-interface of the electric timer. Depressing timer duration selector 22 allows the user to visually see and choose time duration sequences which have been pre-programmed within the timer's microprocessor control. Each time the time duration selector 22 is depressed, another timing choice is displayed on digital display 28, and repeat as needed. Once the selection is made, the user depresses timer activation selector 24, which causes the timer's microprocessor control to begin the timer countdown sequence and energize receptacle 36. The microprocessor provides ongoing timer status via digital display 28, including "on" status. Depressing timer reset selector 26 signals the timer's microprocessor to de-energize receptacle 36 and reset the selected timing function and digital display 28 to zero status.

Referring again to FIGS. 1 and 2, and located on the front surface 16 are test and reset buttons (32 and 34, respectively), which are dedicated solely to the shock protection circuitry provided-for, and contained within the timer housing 12. Test button 32 provides methodology for testing ground-fault protection circuitry within the timer housing 12. Reset button 34 provides the mechanical means for resetting the fault-tripped or trip-tested ground-fault protection circuitry provided within timer housing 12. Shock protection shall be provided with the inclusion of ground-fault protection circuitry. Shock protection via ground-fault protection circuitry, provided within the timer housing 12, is interconnected to test button 32 and to reset button 34, and function to interrupt electrical energization to receptacle 36 in the event of electrical fault or by circuit electrical testing procedures, provided whenever test button 32 is depressed.

Referring to FIG. 3, a left side view of timer 10 is shown. Timer housing 12 is shown. The orientation of front surface 16 is depicted. A profile of conventional plug 14 is shown, as is left-side view profile of outlet receptacle 36, and test button 32. A left-side view profile of time duration selector 22 is also shown.

Referring to FIG. 4, a rear view of timer 10 is shown. Rear surface 15 is depicted, as is timer housing 12. Conventional plug 14 is also depicted. A two-prong version of conventional plug 14 is indicated in this view, however alternate embodiments may include a conventional plug having three prongs.

Referring to FIG. 5, a top view of timer 10 is shown. Timer housing 12 is indicated, as is a top-view of conventional plug 14. Individual profiles of time duration selector 22, timer activation selector 24, and timer reset selector 26 are also depicted.

FIG. 6 is a diagram illustrating a process flow through the installation, timed selection, and activation process by the user, utilizing the various timer selectors, plug, receptacle, and digital display as indicated in FIGS. 1 through 5. At step 50, the user plugs the timer into a conventional electrical receptacle, using the conventional plug located on the rear surface of the timer housing. At Step 52, the timer's microprocessor control becomes energized and activated via electrical current provided through step 50. At step 54, the microprocessor control activates the timer's digital display, and conveys "OFF" mode to the user via said display. At step 56, the user connects an electrical appliance they wish to be controlled by the timer, to the timer's conventional receptacle located on the front surface of the timer housing. At step 58, the user would view and select a timed duration interval by depressing the time duration selector button located on the front surface of the timer housing. At step 60, the timer's microprocessor control responds to the request for timing interval selections by displaying the various timing choices on the timer's digital display. Time duration choices "2:00 minutes", "5:00 minutes", "15:00 minutes", "30:00 minutes", and "60:00 minutes", as an example, appear individually on the digital display, with one choice indicated for each time the time selector button is depressed. At step 62, the user may choose to depress the time selection button again. Subsequent depression of the time selection button changes the visual indicia on the digital display to reflect the timings intervals and process as indicated in step 60. At step 64, the user must decide which individual time duration selection will be used. If the user has not yet decided, they can simply depress the timer selection button repeatedly until the pre-programmed timing choice they plan to use, and as indicated in step 60, is displayed. If the user has made a decision, and that particular timed selection is indicated on the timer's digital display, the user moves onto step 66. At step 66, the user depresses the timer activation selector located on the front surface of the timer housing. At step 68, the timers microprocessor control responds to the action taken in step 66, and energizes the timer's receptacle by internally connecting the timer's electrical plug to its output receptacle, via internal circuitry comprised of solid-state and/or electrical switching mechanisms, and through the timer's shock protection circuitry. Once the receptacle is energized, the microprocessor control begins the timer countdown sequence, and signals the digital display to indicate the status of said countdown sequence. At step 70, the user decides whether or not they wish to allow the timer to complete its receptacle energization cycle. If they do not, they simply depress the timer reset/off selector, as indicated in step 72, which immediately advances the timing process to step 74. If they wish the timed cycle to complete, they do nothing, and allow the process to complete automatically. At step 74, the timer's microprocessor control completes the countdown cycle and de-energizes the timer's receptacle. Once the process is complete, the timer's microprocessor control signals the digital display to indicate an "OFF" condition, as indicated in step 76. The timer is returned to a ready state.

In alternative embodiments, other means may be used to set, reset, activate, or deactivate the pre-set and microprocessor controlled switching times and energization of receptacle 36. Alternate embodiments may also include membrane-switch or heat-sensitive receptor switch technology for timer selection, activation, and reset/off modalities. It is therefore intender, that the foregoing detailed description be regarded as illustrative rather than limiting and that it is understood that the claims contained within this Application, including all equivalents, are intended to define the scope of the invention.

I claim:

1. An improved electrical timer used to turn on and off an electrical supply to an electrical receptacle, and where the timer comprises:

microprocessor controlled pre-set timing scales allowing for "timed" energization of the electrical receptacle contained within the timer housing, and pre-set timing options, which function absent of time-of-day, day-of-week, or other chronological, calendar-based, or inter-dependent restrictions or requirements of operation, and a switching mechanism allowing for the continuous energization of the electrical receptacle contained within the timer housing, and a manual reset mechanism which allows for the immediate de-energization of the electrical receptacle contained within the timer housing, and a visual representation of the pre-set timer settings, via digital display of the ongoing status of the timing function (time remaining), and ground-fault circuit protection, and visual indicators which provide the status of the timer.

2. The invention of claim 1 wherein pre-set timing scales function absent of time-of-day, day-of-week, or other chronological, calendar-based, inter-dependent restrictions or requirements of operation, or the like, and which include including timing scales which are pre-set during the manufacturing and assembly process, and which are permanently stored within a the microprocessor control's e-prom or other solid-state circuitry, and will retain its pre-set timing scales without the need for an internal battery source or external power to provide continuous voltage to the microprocessor control to maintain pre-programmed timing options.

3. The invention of claim 1 wherein said pre-set timing scales are set and are not adjustable in the field.

4. The invention of claim 1 wherein the output operating voltage of the timing unit may be interrupted at any time via manual reset switch or methodology.

5. The invention of claim 1 wherein ground-fault protection circuitry is functioning portions of the unit's overall circuitry and contained within the timer housing.

6. An electrical timer of the type used to automatically turn on and off a supply of electricity by setting of desired switching times on a ground-fault circuit protected interface thereof, said electrical timer comprising: a housing, and microprocessor controlled timing scales and switches, and mounted in said housing, and pre-set timing selections provider-for via electronic switched and solid-state circuitry, or via pre-set or limited timing scale, located on and in said housing, and manual reset capabilities, and timer bypass capabilities, and electrical circuitry providing shock protection via ground-fault protection, and a receptacle.

7. An improved electrical timer, wherein said electrical timer is of a type which includes solid-state timing circuitry, including:

electronic switches marked with indicia for selecting timer pre-sets, and visual means indicating timer status, including: time remaining, time programmed, receptacle energization status, etc., and visual means indicating timing unit's electrical status as it relates to built-in shock protection including ground fault protection circuitry, and physical means of testing units electrical status as it relates to built-in shock protection, including ground-fault protection circuitry.

* * * * *